(12) United States Patent
Wang et al.

(10) Patent No.: US 12,743,884 B2
(45) Date of Patent: Sep. 22, 2026

(54) VERSATILE ACTION MODELS (VAMOS) FOR VIDEO UNDERSTANDING

(71) Applicants: Honda Motor Co., Ltd., Tokyo (JP); Brown University, Providence, RI (US)

(72) Inventors: Shijie Wang, Providence, RI (US); Qi Zhao, Riverside, RI (US); Minh Quan Do, Providence, RI (US); Nakul Agarwal, San Francisco, CA (US); Kwonjoon Lee, San Jose, CA (US); Chen Sun, San Francisco, CA (US)

(73) Assignees: Honda Motor Co., Ltd., Tokyo (JP); Brown University, Providence, RI (US)

( * ) Notice: Subject to any disclaimer, the term of this patent is extended or adjusted under 35 U.S.C. 154(b) by 245 days.

(21) Appl. No.: 18/614,205

(22) Filed: Mar. 22, 2024

(65) Prior Publication Data

US 2025/0166377 A1 May 22, 2025

Related U.S. Application Data

(60) Provisional application No. 63/601,124, filed on Nov. 20, 2023.

(51) Int. Cl.
*G06V 20/40* (2022.01)
*G06F 40/284* (2020.01)

(52) U.S. Cl.
CPC ............ *G06V 20/41* (2022.01); *G06F 40/284* (2020.01)

(58) Field of Classification Search
CPC ....... G06V 20/41; G06V 10/82; G06F 40/284
See application file for complete search history.

(56) References Cited

PUBLICATIONS

Socratic Models, Zeng et al 2022 (Year: 2022).*
VideoLLM, Chen et al May 2023 (Year: 2023).*
Jiasen Lu, Dhruv Batra, and Devi Parikh. Vilbert: Pretraining task-agnostic visiolinguistic representations for vision-and-language tasks. In NeurIPS, 2019.
Karttikeya Mangalam, Raiymbek Akshulakov, and Jitendra Malik. Egoschema: A diagnostic benchmark for very long-form video language understanding. arXiv preprint arXiv:2308.09126, 2023.
Matthias Minderer, Chen Sun, Ruben Villegas, Forrester Cole, Kevin P Murphy, and Honglak Lee. Unsupervised learning of object structure and dynamics from videos. In NeurIPS, 2019.
Suvir Mirchandani, Fei Xia, Pete Florence, Brian Ichter, Danny Driess, Montserrat Gonzalez Arenas, Kanishka Rao, Dorsa Sadigh, and Andy Zeng. Large language models as general pattern machines. arXiv preprint arXiv:2307.04721, 2023.
Seungwhan Moon, Andrea Madotto, Zhaojiang Lin, Tushar Nagarajan, Matt Smith, Shashank Jain, Chun-Fu Yeh, Prakash Murugesan, Peyman Heidari, Yue Liu, et al. Anymal: An efficient and scalable any-modality augmented language model. arXiv preprint arXiv:2309.16058, 2023.
Ram Nevatia, Jerry Hobbs, and Bob Bolles. An ontology for video event representation. In CVPR Workshop, 2004.
(Continued)

*Primary Examiner* — Jianxun Yang
(74) *Attorney, Agent, or Firm* — Weiss & Moy, P.C.; Jeffrey D. Moy

(57) ABSTRACT

A method for forming versatile action models for video understanding may gather data from a video. The data may comprise textual video representations and other task specific language inputs. The method may use a pre-trained large language model (LLM) next token prediction for action anticipation based on the data from the video.

17 Claims, 4 Drawing Sheets

(56) References Cited

PUBLICATIONS

Long Ouyang, Jeff Wu, Xu Jiang, Diogo Almeida, Carroll L Wainwright, PamelaMishkin, Chong Zhang, Sandhini Agarwal, Katarina Slama, Alex Ray, et al. Training language models to follow instructions with human feedback, 2022. URL https://arxiv. org/abs/2203.02155, 13, 2022.
Katerina Pastra and Yiannis Aloimonos. The minimalist grammar of action. Philosophical Transactions of the Royal Society B: Biological Sciences, 2012.
Mingtao Pei, Yunde Jia, and Song-Chun Zhu. Parsing video events with goal inference and intent prediction. In ICCV, 2011.
Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. Learning transferable visual models from natural language supervision. arXiv preprint arXiv:2103.00020, 2021.
Sreemanananth Sadanand and Jason J Corso. Action bank: A high-level representation of activity in video. In CVPR, 2012.
Timo Schick, Jane Dwivedi-Yu, Roberto Dess'i, Roberta Raileanu, Maria Lomeli, Luke Zettlemoyer, Nicola Cancedda, and Thomas Scialom. Toolformer: Language models can teach themselves to use tools. arXiv preprint arXiv:2302.04761, 2023.
Amanpreet Singh, Ronghang Hu, Vedanuj Goswami, Guillaume Couairon, Wojciech Galuba, Marcus Rohrbach, and Douwe Kiela. Flava: A foundational language and vision alignment model. In Proceedings of the IEEE/CVF Conference on Computer Vision and Pattern Recognition, pp. 15638-15650, 2022.
Chen Sun, Zhe Gan, Ricardo Henao, Yizhe Shen, and Xiaodong Liu. Videobert: A joint model for video and language representation learning. In NeurIPS, 2019.
D'idac Sur'is, SachitMenon, and Carl Vondrick. Vipergpt: Visual inference via python execution for reasoning. In ICCV, 2023.
Hui Tan andMohit Bansal. Lxmert: Learning cross-modality encoder representations from transformers. In EMNLP, 2019.
Hugo Touvron, Louis Martin, Kevin Stone, Peter Albert, Amjad Almahairi, Yasmine Babaei, Nikolay Bashlykov, Soumya Batra, Prajjwal Bhargava, Shruti Bhosale, et al. Llama 2: Open foundation and fine-tuned chat models. arXiv preprint arXiv:2307.09288, 2023.
Carl Vondrick, Hamed Pirsiavash, and Antonio Torralba. Generating videos with scene dynamics. In NeurIPS, 2016.
Alex Jinpeng Wang, Yixiao Ge, Rui Yan, Ge Yuying, Xudong Lin, Guanyu Cai, Jianping Wu, Ying Shan, Xiaohu Qie, and Mike Zheng Shou. All in one: Exploring unified video-language pre-training. In CVPR, 2023.
Jinpeng Wang, Yixiao Ge, Rui Yan, Yuying Ge, Kevin Qinghong Lin, Satoshi Tsutsui, Xudong Lin, Guanyu Cai, Jianping Wu, Ying Shan, et al. All in one: Exploring unified video-language pre-training. In Proceedings of the IEEE/CVF Conference on Computer Vision and Pattern Recognition, pp. 6598-6608, 2023.
Xiaolong Wang, Ali Farhadi, and Abhinav Gupta. Actions transformations. In CVPR, 2016.
Yi Wang, Kunchang Li, Yizhuo Li, Yinan He, Bingkun Huang, Zhiyu Zhao, Hongjie Zhang, Jilan Xu, Yi Liu, Zun Wang, et al. Internvideo: General video foundation models via generative and discriminative learning. arXiv preprint arXiv:2212.03191, 2022.
Chen Wei, Chenxi Liu, Siyuan Qiao, Zhishuai Zhang, Alan Yuille, and Jiahui Yu. De-diffusion makes text a strong cross-modal interface. arXiv preprint arXiv:2311.00618, 2023.
Jason Wei, Xuezhi Wang, Dale Schuurmans, Maarten Bosma, Fei Xia, Ed Chi, Quoc V Le, Denny Zhou, et al. Chain-of-thought prompting elicits reasoning in large language models. In NeurIPS, 2022.
Junbin Xiao, Xindi Shang, Angela Yao, and Tat-Seng Chua. Next-qa: Next phase of question-answering to explaining temporal actions. In CVPR, 2021.
Junbin Xiao, Angela Yao, Zhiyuan Liu, Yicong Li, Wei Ji, and Tat-Seng Chua. Video as conditional graph hierarchy for multi-granular question answering. In Proceedings of the AAAI Conference on Artificial Intelligence, pp. 2804-2812, 2022.
Junbin Xiao, Pan Zhou, Tat-Seng Chua, and Shuicheng Yan. Video graph transformer for video question answering. In European Conference on Computer Vision, pp. 39-58. Springer, 2022.
Wilson Yan, Yunzhi Zhang, Pieter Abbeel, and Aravind Srinivas. Videogpt: Video generation using vq-vae and transformers. arXiv preprint arXiv:2104.10157, 2021.
Antoine Yang, Antoine Miech, Josef Sivic, Ivan Laptev, and Cordelia Schmid. Zero-shot video question answering via frozen bidirectional language models. Advances in Neural Information Processing Systems, 35:124-141, 2022.
Qinghao Ye, Guohai Xu, Ming Yan, Haiyang Xu, Qi Qian, Ji Zhang, and Fei Huang. Hitea: Hierarchical temporal-aware video-language pre-training. In Proceedings of the IEEE/CVF International Conference on Computer Vision, pp. 15405-15416, 2023.
Qinghao Ye, Haiyang Xu, Guohai Xu, Jiabo Ye, Ming Yan, Yiyang Zhou, Junyang Wang, Anwen Hu, Pengcheng Shi, Yaya Shi, et al. mplug-owl: Modularization empowers large language models with multimodality. arXiv preprint arXiv:2304.14178, 2023.
Jiahui Yu, Zirui Wang, Vijay Vasudevan, Legg Yeung, Mojtaba Seyedhosseini, and Yonghui Wu. Coca: Contrastive captioners are image-text foundation models. arXiv preprint arXiv:2205.01917, 2022.
Shoubin Yu, Jaemin Cho, Prateek Yadav, and Mohit Bansal. Self-chained image-language model for video localization and question answering. arXiv preprint arXiv:2305.06988, 2023.
Mert Yuksekgonul, Maggie Wang, and James Zou. Post-hoc concept bottleneck models. arXiv preprint arXiv:2205.15480, 2022.
Rowan Zellers, Ximing Lu, Jack Hessel, Youngjae Yu, Jae Sung Park, Jize Cao, Ali Farhadi, and Yejin Choi. Merlot: Multimodal neural script knowledge models. In NeurIPS, 2021.
Rowan Zellers, Jiasen Lu, Ximing Lu, Youngjae Yu, Yanpeng Zhao, Mohammadreza Salehi, Aditya Kusupati, Jack Hessel, Ali Farhadi, and Yejin Choi. Merlot reserve: Neural script knowledge through vision and language and sound. In Proceedings of the IEEE/CVF Conference on Computer Vision and Pattern Recognition, pp. 16375-16387, 2002.
Andy Zeng, Maria Attarian, Brian Ichter, Krzysztof Choromanski, Adrian Wong, Stefan Welker, Federico Tombari, Aveek Purohit, Michael Ryoo, Vikas Sindhwani, et al. Socratic models: Composing zero-shot multimodal reasoning with language. arXiv preprint arXiv:2204.00598, 2022.
Qi Zhao, Ce Zhang, Shijie Wang, Changcheng Fu, Nakul Agarwal, Kwonjoon Lee, and Chen Sun. Antgpt: Can large language models help long-term action anticipation from videos? arXiv preprint arXiv:2307.16368, 2023.
Mohamad Javad Aein, Eren Erdal Aksoy, and Florentin WO"rgo"tter. Library of actions: Implementing a generic robot execution framework by using manipulation action semantics. The International Journal of Robotics Research, 2019.
Jean-Baptiste Alayrac, Jeff Donahue, Pauline Luc, Antoine Miech, lain Barr, Yana Hasson, Karel Lenc, Arthur Mensch, Katherine Millican, Malcolm Reynolds, et al. Flamingo: a visual language model for few-shot learning. In NeurIPS, 2022.
Zeyuan Allen-Zhu and Yuanzhi Li. Physics of language models: Part 1, context-free grammar. arXiv preprint arXiv:2305.13673, 2023.
Enric Boix-Adsera', Omid Saremi, Emmanuel Abbe, Samy Bengio, Etai Littwin, and Joshua Susskind. When can transformers reason with abstract symbols? arXiv preprint arXiv:2310.09753, 2023.
Shyamal Buch, Cristo'bal Eyzaguirre, Adrien Gaidon, Jiajun Wu, Li Fei-Fei, and Juan Carlos Niebles. Revisiting the"video" in video-language understanding. In Proceedings of the IEEE/CVF conference on computer vision and pattern recognition, pp. 2917-2927, 2022.
Fabian Caba Heilbron, Victor Escorcia, Bernard Ghanem, and Juan Carlos Niebles. Activitynet: A large-scale video benchmark for human activity understanding. In CVPR, 2015.
Joao Carreira and Andrew Zisserman. Quo vadis, action recognition? a new model and the kinetics dataset. In CVPR, 2017.

(56) References Cited

PUBLICATIONS

Guo Chen, Yin-Dong Zheng, Jiahao Wang, Jilan Xu, Yifei Huang, Junting Pan, Yi Wang, Yali Wang, Yu Qiao, Tong Lu, et al. Videollm: Modeling video sequence with large language models. arXiv preprint arXiv:2305.13292, 2023.
Jun Chen, Han Guo, Kai Yi, Boyang Li, and Mohamed Elhoseiny. Visualgpt: Data-efficient adaptation of pretrained language models for image captioning. In Proceedings of the IEEE/CVF Conference on Computer Vision and Pattern Recognition, pp. 18030-18040, 2022.
Junwen Chen, Jie Zhu, and Yu Kong. Atm: Action temporality modeling for video question answering. In Proceedings of the 31st ACM International Conference on Multimedia, pp. 4886-4895, 2023.
Liunian Harold Chen, Yukun Zhu, Yen-Chun Shen, Heng Gao, Xiaodong Liu, Xiaohui Shen, Zhe He, Ricardo Henao, Renjie Miao, Yuan Guo, et al. Uniter: Universal image-text representation learning. In ECCV, 2020.
Dima Damen, Hazel Doughty, Giovanni Maria Farinella, Sanja Fidler, Antonino Furnari, Evangelos Kazakos, Davide Moltisanti, Jonathan Munro, Toby Perrett, Will Price, et al. Scaling egocentric vision: The epic-kitchens dataset. In ECCV, 2018.
Ishita Dasgupta, Andrew K Lampinen, Stephanie CY Chan, Antonia Creswell, Dharshan Kumaran, James LMcClelland, and Felix Hill. Language models show human-like content effects on reasoning. arXiv preprint arXiv:2207.07051, 2022.
David Ding, Felix Hill, Adam Santoro, Malcolm Reynolds, and Matt Botvinick. Attention over learned object embeddings enables complex visual reasoning. In NeurIPS, 2021.
Dave Epstein, Jiajun Wu, Cordelia Schmid, and Chen Sun. Learning temporal dynamics from cycles in narrated video. In ICCV, 2021.
Christoph Feichtenhofer, Haoqi Fan, Jitendra Malik, and Kaiming He. Slowfast networks for video recognition. In Proceedings of the IEEE/CVF international conference on computer vision, pp. 6202-6211, 2019.
Tsu-Jui Fu, Linjie Li, Zhe Gan, Kevin Lin, William Yang Wang, Lijuan Wang, and Zicheng Liu. Violet: End-to-end video-language transformers with masked visual-token modeling. arXiv preprint arXiv:2111.12681, 2021.
Tsu-Jui Fu, Linjie Li, Zhe Gan, Kevin Lin, William Yang Wang, Lijuan Wang, and Zicheng Liu. An empirical study of end-to-end video-language transformers with masked visual modeling. In Proceedings of the IEEE/CVF Conference on Computer Vision and Pattern Recognition, pp. 22898-22909, 2023.
Andreas F"urst, Elisabeth Rumetshofer, Johannes Lehner, Viet T Tran, Fei Tang, Hubert Ramsauer, David Kreil, Michael Kopp, G"unter Klambauer, Angela Bitto, et al. Cloob: Modern hopfield networks with infoloob outperform clip. Advances in neural information processing systems, 35: 20450-20468, 2022.
Difei Gao, Luowei Zhou, Lei Ji, Linchao Zhu, Yi Yang, and Mike Zheng Shou. Mist: Multi-modal iterative spatial-temporal transformer for long-form video question answering. In Proceedings of the IEEE/CVF Conference on Computer Vision and Pattern Recognition, pp. 14773-14783, 2023.
Kristen Grauman, Andrew Westbury, Eugene Byrne, Zachary Chavis, Antonino Furnari, Rohit Girdhar, Jackson Hamburger, Hao Jiang, Miao Liu, Xingyu Liu, et al. Ego4d: 670 Around the world in 3,000 hours of egocentric video. In CVPR, 2022.
Nate Gruver, Marc Finzi, Shikai Qiu, and Andrew Gordon Wilson. Large language models are zero-shot time series forecasters. arXiv preprint arXiv:2310.07820, 2023.
Chunhui Gu, Chen Sun, David A Ross, Carl Vondrick, Caroline Pantofaru, Yeqing Li, Sudheendra Vijayanarasimhan, George Toderici, Susanna Ricco, Rahul Sukthankar, et al. Ava: A video dataset of spatio-temporally localized atomic visual actions. In CVPR, 2018.
Tanmay Gupta and Aniruddha Kembhavi. Visual programming: Compositional visual reasoning without training. In CVPR, 2023.
Somboon Hongeng, Ram Nevatia, and Francois Bremond. Video-based event recognition: activity representation and probabilistic recognition methods. Computer Vision and Image Understanding, 2004.
Edward J Hu, Yelong Shen, Phillip Wallis, Zeyuan Allen-Zhu, Yuanzhi Li, Shean Wang, Lu Wang, and Weizhu Chen. Lora: Low-rank adaptation of large language models. arXiv preprint arXiv:2106.09685, 2021.
Ziniu Hu, Ahmet Iscen, Chen Sun, Kai-Wei Chang, Yizhou Sun, David A Ross, Cordelia Schmid, and Alireza Fathi. Avis: Autonomous visual information seeking with large language models. arXiv preprint arXiv:2306.08129, 2023.
Daoji Huang, Otmar Hilliges, Luc Van Gool, and Xi Wang. Palm: Predicting actions through language models@ ego4d long-term action anticipation challenge 2023. arXiv preprint arXiv:2306.16545, 2023.
Tatsuya Ishibashi, Kosuke Ono, Noriyuki Kugo, and Yuji Sato. Technical report for ego4d long term action anticipation challenge 2023. arXiv preprint arXiv:2307.01467, 2023.
Yuri A. Ivanov and Aaron F. Bobick. Recognition of visual activities and interactions by stochastic parsing. IEEE Transactions on Pattern Analysis and Machine Intelligence, 2000.
Eric Jang, Shixiang Gu, and Ben Poole. Categorical reparameterization with gumbel-softmax. arXiv preprint arXiv:1611.01144, 2016.
Dinesh Jayaraman, Frederik Ebert, Alexei A Efros, and Sergey Levine. Time-agnostic prediction: Predicting predictable video frames. arXiv preprint arXiv:1808.07784, 2018.
Chao Jia, Yinfei Yang, Ye Xia, Yi-Ting Chen, Zarana Parekh, Hieu Pham, Quoc Le, Yun-Hsuan Sung, Zhen Li, and Tom Duerig. Scaling up visual and vision-language representation learning with noisy text supervision. In International conference on machine learning, pp. 4904-4916. PMLR, 2021.
Pin Jiang and Yahong Han. Reasoning with heterogeneous graph alignment for video question answering. In Proceedings of the AAAI Conference on Artificial Intelligence, 2020.
Yu-Gang Jiang, Subhabrata Bhattacharya, Shih-Fu Chang, and Mubarak Shah. High-level event recognition in unconstrained videos. International journal of multimedia information retrieval, 2013.
Sai Shashank Kalakonda, Shubh Maheshwari, and Ravi Kiran Sarvadevabhatla. Action-gpt: Leveraging large-scale language models for improved and generalized zero shot action generation. arXiv preprint arXiv:2211.15603, 2022.
Yan Ke, Rahul Sukthankar, and Martial Hebert. Event detection in crowded videos. In ICCV, 2007.
Dohwan Ko, Ji Soo Lee, Wooyoung Kang, Byungseok Roh, and Hyunwoo J Kim. Large language models are temporal and causal reasoners for video question answering. In EMNLP, 2023.
Pang Wei Koh, Thao Nguyen, Yew Siang Tang, Stephen Mussmann, Emma Pierson, Been Kim, and Percy Liang. Concept bottleneck models. In International conference on machine learning, pp. 5338-5348. PMLR, 2020.
Thao Minh Le, Vuong Le, Svetha Venkatesh, and Truyen Tran. Hierarchical conditional relation networks for multimodal video question answering. International Journal of Computer Vision, 129(11):3027-3050, 2021.
Jonathan Lester, Tanzeem Choudhury, Nicky Kern, Gaetano Borriello, and Blake Hannaford. A hybrid discriminative/generative approach for modeling human activities. In IJCAI, 2005.
Junnan Li, Dongxu Li, Silvio Savarese, and Steven Hoi. Blip-2: Bootstrapping language-image pre-training with frozen image encoders and large language models. arXiv preprint arXiv:2301.12597, 2023.
Junnan Li, Dongxu Li, Silvio Savarese, and Steven Hoi. BLIP-2: bootstrapping language-image pre-training with frozen image encoders and large language models. In ICML, 2023.
Jiapeng Li, Ping Wei, Wenjuan Han, and Lifeng Fan. Intentqa: Context-aware video intent reasoning. In ICCV, 2023.
Liunian Harold Li, Mark Yatskar, Da Yin, Cho-Jui Hsieh, Yiming Chang, and Kai Wang. Visualbert: A simple and performant baseline for vision and language. arXiv preprint arXiv:1908.03557, 2019.
Ruilong Li, Shan Yang, David A Ross, and Angjoo Kanazawa. Ai choreographer: Music conditioned 3d dance generation with aist++. In ICCV, 2021.

(56) References Cited

PUBLICATIONS

Xiujun Li, Xi Yin, Chunyuan Li, Xiaowei Hu, Pengchuan Zhang, Lei Zhang, Lijuan Wang, Houdong Hu, Li Dong, Fei Wei, et al. Oscar: Object-semantics aligned pre-training for vision-language tasks. 2020.

Yangguang Li, Feng Liang, Lichen Zhao, Yufeng Cui, Wanli Ouyang, Jing Shao, Fengwei Yu, and Junjie Yan. Supervision exists everywhere: A data efficient contrastive language-image pre-training paradigm. arXiv preprint arXiv:2110.05208, 2021.

Haotian Liu, Chunyuan Li, QingyangWu, and Yong Jae Lee. Visual instruction tuning. arXiv preprint arXiv:2304.08485, 2023.

Miao Liu, Siyu Tang, Yin Li, and James M Rehg. Forecasting human-object interaction: joint prediction of motor attention and actions in first person video. In ECCV, 2020.

* cited by examiner

VLM Captioner: A Monkey Sitting And Holding a Stick (A) POSITIVE EXAMPLE

FRAMES

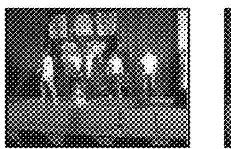
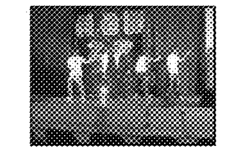
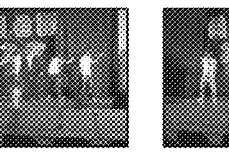
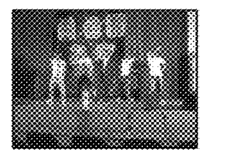
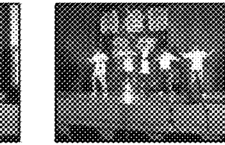

QUESTION: "WHERE ARE THE PEOPLE PERFORMING? CHOICES: (A) ON STAGE. (B) STREET. © GRASS PATCH. (D) IN THE SEA. (E) POOL"
TOKENS: [STAGE', 'DAN', 'ERS', 'FRONT', 'STAGE', 'VISUAL', 'DANCE', "DANCE', 'FRONT', 'BOTT', 'STAGE', 'CHAIR', 'MICRO', 'VARIOUS', 'STAGE', 'SYNC', 'DANCE', 'ROUTINE', 'FRONT', "FRONT', 'DANCE', "BOTT', 'NEARBY']
PREDICTION: (A) ON STAGE (B) POSITIVE EXAMPLE

FRAMES

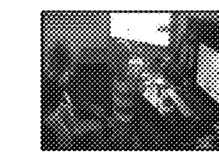
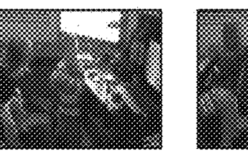
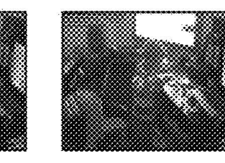
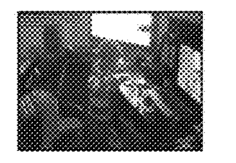
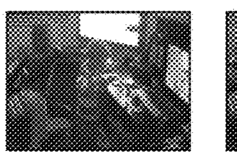

QUESTION: "WHERE IS THIS VIDEO TAKEN? CHOICES: (A) SEA. (B) ROAD. (C) ROOM. (D) ON THE PLANE. (E) OUTDOOR"
TOKENS: ['ROOM', 'COMPUTER', 'PLAYING', 'TV', 'WALL', 'ROOM', 'PLAYING', 'ROOM', 'LIVING', 'CHAIR', 'PLAYING', 'CHAIR', 'TV', 'NEARBY', 'PLACED', 'CUP', 'CAPT', 'FRONT', 'ADJUST', 'JOIN', 'ACTIVITY', 'PORTION', 'OUCH', 'RELAX', 'GLASS', 'FRONT', 'ROOM', 'DOOR']
PREDICTION: (C) ROOM (C) NEGATIVE EXAMPLE

FRAMES

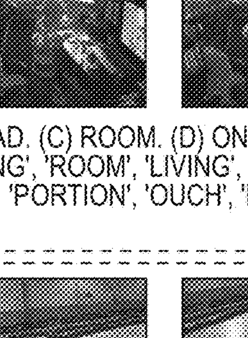
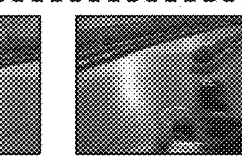
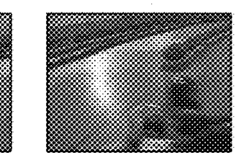

QUESTION: "WHY ARE THERE TYRES AROUND? CHOICES: (A) FOR WEIGHLIFTING. (B) ATTACHED TO THE CARS. (C) BORDER OF RACE TRACK. (D) TO PREVENT DOGS FROM ESCAPING. (E) PART OF THE PLAYGROUND
TOKENS: ['ROW', 'RACE', 'RACE', 'RACING', 'BACK', 'CONCRETE', 'BACK', 'STORAGE', 'EACH', 'MOTOR', 'CONCRETE', 'STACK', 'RACING', 'GO', 'RACE', 'RIDE', 'SCENE', 'GO', 'RACE', 'TRACK', 'BACKGROUND', 'GO', 'TRACK', 'NAVIG', 'TRACK', 'RACE', 'RACE', 'TRACK', 'NAVIG']
PREDICTION: (B) ATTACHED TO THE CARS
INTERVENED TOKENS: ['ROW', 'RACE', 'RACE', 'RACING', 'RACE', 'CONCRETE', 'RACE', 'TRACK', 'EACH', 'MOTOR', 'CONCRETE', 'STACK', 'RACING', 'GO', 'RACE', 'RIDE', 'SCENE', 'GO', 'RACE', 'TRACK', 'BACKGROUND', 'GO', 'TRACK', 'RACE', 'TRACK', 'RACE', 'RACE', 'TRACK', 'RACE']
NEW PREDICTION: (C) BORDER OF RACE TRACK

FIG. 4

VERSATILE ACTION MODELS (VAMOS) FOR VIDEO UNDERSTANDING

RELATED DISCLOSURE

This patent disclosure is related to U.S. Provisional Application No. 63/601,124 filed Nov. 20, 2023, entitled "Vamos: Versatile Action Models for Video Understanding", in the names of the same inventors which is incorporated herein by reference in its entirety. The present patent disclosure claims the benefit under 35 U.S.C § 119(e) of the aforementioned provisional application.

BACKGROUND

Building a generative model for everyday human activities has long been desirable for researchers working on video understanding. Central to this issue may be capturing the interactions between humans and the environment, modeling the temporal dynamics of activities, and encoding the hierarchical structures among atomic actions, activities, and events. Once constructed, the generative model of actions may be applied to a wide range of tasks, including activity and event recognition, future behavior prediction, goal and inference, and temporal reasoning.

Despite its desirable properties, generative modeling of actions from video observations remains challenging, which may be hindered by two open research questions: First, what makes good video representations? Earlier attempts may have relied on manually defining the actions and the objects being interacted with. They may have required task-specific prior knowledge, and cannot generalize to the "open vocabulary" scenarios in the wild. Alternative approaches may aim to model the temporal dynamics of human pose or latent representations encoded by deep neural networks, which may be either too fine-grained, or not directly interpretable. Second, what may make a good model of human actions? While earlier approaches may have attempted to apply rule-based generative action grammars, they may not be able to capture the diverse, even peculiar ways of how events would unfold over time. More recent approaches may have adopted a data-driven framework and directly learn autoregressive models on visual tokens, where the visual domain may be often specialized (e.g., cooking, or robotics).

Limitations and disadvantages of conventional and traditional approaches will become apparent to one of skill in the art, through comparison of described method with some aspects of the present disclosure, as set forth in the remainder of the present disclosure and with reference to the drawings.

SUMMARY

According to an embodiment of the disclosure, a method for forming versatile action models for video understanding is provided. The method may gather data from a video, wherein the date comprises textual video representations and other task specific language inputs. The method may use a pre-trained large language model (LLM) next token prediction for action anticipation based on the data from the video.

According to another embodiment of the disclosure, a method for forming versatile action models for video understanding, the method implemented using a computer system including a processor communicatively coupled to a memory device is provided. The method may gather data from a video by converting visual inputs from the video into discrete action labels and free-form descriptions by condensing the video into sequences of discrete action labels through application of action recognition models that operate in a predefined action space, and processing sampling frames to produce frame level captions, which are concatenated to form a comprehensive video-level caption. The method may further use a pre-trained large language model (LLM) next token prediction for action anticipation based on the data from the video by unifying video dynamic modeling tasks, wherein the video dynamic modeling tasks comprises comprehending historical content and future prediction.

According to an embodiment of the disclosure, a method for forming versatile action models for video understanding is provided. The method may gather data from a video, wherein gathering data from a video comprises converting visual inputs from the video into discrete action labels and free-form descriptions by condensing the video into sequences of discrete action labels through application of action recognition models that operate in a predefined action space, and processing sampling frames to produce frame level captions, which are concatenated to form a comprehensive video-level caption. The method may generate a corresponding text token by inputting the discrete action labels and free-form descriptions into a frozen word embedding layer, wherein the frozen word embedding layer samples a predetermined number of frames from the video and generates visual features, wherein the visual features are inputted into a projection layer to produce vision tokens. The method may further concatenate the vision tokens. The method may feed the concatenated vision tokens into a pre-trained LLM next token prediction for action anticipation based on the data from the video by unifying video dynamic modeling tasks, wherein the video dynamic modeling tasks comprises comprehending historical content and future prediction.

BRIEF DESCRIPTION OF THE DRAWINGS

FIG. 4 shows exemplary block diagrams illustrating Vamos predictions with token selector and manual intervention.

Figure 1:
FIG. 1 is a front view of a pair of pictures having diverse appearances but the same caption, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The present disclosure provides versatile action models (Vamos) which provide a learning framework powered by a large language model as the "reasoner". Vamos may flexibly unify distributed visual features and textual video representations including discrete action labels and free-form video captions. By performing sequence modeling, Vamos may be applied to multiple video understanding tasks. A lightweight token selector may be used as an add-on module of Vamos. The lightweight token selector may pick one single token from the video sequence based on the task sequence. By applying the token selector to k segments of the textual video representation, k tokens may be selected as the compact input to the LLM for down-stream tasks.

Reference will now be made in detail to specific aspects or features, examples of which are illustrated in the accompanying drawings. Wherever possible, corresponding, or similar reference numbers will be used throughout the drawings to refer to the same or corresponding parts.

Anticipating future activities or answering video-conditioned questions may make for good video representations for video understanding. While earlier approaches may have focused on end-to-end learning directly from video pixels, the system and method described herein may use text-based representations, such as discrete action labels, or free-form video captions, which may be interpretable and may be directly consumed by large language models (LLMs). Intuitively, different video understanding tasks may require representations that are complementary and at different granularities. To this end, versatile action models (Vamos) may be proposed which may include a learning framework powered by a large language model as the "reasoner", and may flexibly leverage visual embeddings, action labels, and free-form descriptions extracted from videos as its input.

The system and method described herein may start by exploring an unconventional idea: May task-agnostic natural language descriptions, such as those generated by off-the-shelf image caption models on sampled video frames, serve as useful video representations for action modeling from videos? And if so, may one leverage a pre-trained large language model (LLM) as the generative model of actions, represented as free-form text? Due to recent advances in LLM research, LLMs have been shown to be capable of learning context-free grammar with long-range dependencies, predicting time series, and performing reasoning, all of which may be used for action modeling.

The system and method described proposes versatile action models (Vamos), a framework that may unify three representations, namely distributed visual embeddings, discrete action labels, and free-form text descriptions, and may be applied to various applications by leveraging LLMs. In accordance with an embodiment, an LLM like Llama-2 may be leveraged. The visual embeddings may be linearly projected into the same language space following standard practice. As illustrated in FIG. 1, the same caption may sometimes be used to describe visually diverse inputs. In this example, both photos may have the same caption a monkey sitting and holding a stick" but may have vastly diverse appearances.

Vamos may explore the use of general-purpose text descriptions of video data for action anticipation and question answering. Vamos may provide a versatile reasoning framework that may allow one to study the impact of latent visual representations, discrete action labels, and free-form text descriptions for downstream applications. It may be important for Vamos to be able to leverage one or multiple representations simultaneously, to understand the impact of individual representation type. Vamos may be able to directly leverage an LLM's next token prediction capability for action anticipation. Similar to how an LLM may be tasked to perform reasoning, Vamos may be able to perform video question answering, by prepending the question to the video representation.

Vamos has been evaluated on four benchmarks, including the Ego4D long-term action anticipation task, NeXT-QA video question answering, IntentQA video question answering, and EgoSchema zero shot long-form video question answering. It may have been observed that for the direct application of Vamos in the action anticipation task, the representation based on discrete action labels outperforms its counterpart based on visual embeddings. One may further observe that free-form video descriptors may serve as an effective long-video representation that may generalize well in zero-shot setting, outperforming the strongest video-language model by 50%. One may then confirm that observations may be general, that text-based representation may consistently provide competitive performance across all tasks, and that adding visual embeddings may only result in marginal performance gains.

Another benefit of text-based video representation may be interpretability. One may exploit this property in two scenarios: First, one may perform causal intervention and correct the sub-optimal video descriptions, and one may observe that the answers may be corrected accordingly. Second, one may propose a lightweight token selector module to sample as few as 20 tokens from video descriptions that may be more than 600 tokens long. One may observe that not only the video question answering performance remains competitive, outperforming the visual embedding baseline, but the selected tokens may be highly related to answering the questions, confirming that the Vamos framework may behave as intended. To summarize, Vamos may make the following contributions:

1. The system and method may revisit video representation and action modeling in the LLM era, and may explore the effectiveness of free-form text descriptions.

2. The system and method may allow one to incorporate and compare the effectiveness of different video representations, both visual and text.

3. The system and method may demonstrate the effectiveness of free-form text representation that is performant, interpretable, and may be intervened, even when aggressively compressed to 6%.

Vision-Language Foundation Models

Vision-Language Models (VLMs) may represent a pivotal convergence in artificial intelligence, aiming to bridge the gap between visual understanding and natural language comprehension. Recent advancements in VLMs may have been propelled by various pretraining techniques leveraging large-scale multimodal datasets. Models such as CLIP, ALIGN, CLOOB, DeCLIP may have bridged the vision and language modalities by learning a text encoder and an image encoder jointly with a contrastive loss, using large datasets consisting of image and caption pairs. Another line of vision-language models showcased by VisualBERT, VIL-BERT, UNITER, LXMERT, OSCAR, FLAVA, may use a combination of Masked-Language Modeling (MLM) and Image-Text Matching (ITM) objectives to align specific parts of images with text and enable various downstream tasks such as visual question answering, visual commonsense reasoning, text-based image retrieval, and text-guided object detection. For videos, VIOLET may train an end-to-end transformer for video and language modalities, by representing videos as visual tokens and performing joint masked token modeling. To perform visual-language joint training, speech transcripts may be used as the language modality for videos. The objectives may be combined and the encoders for different modalities may be shared. Compared to existing vision-language models, Vamos may impose an "information bottleneck" when text-based representation is used: It converts visual inputs into discrete actions and free-form descriptions.

Visually-Augmented LLMs

Apart from joint visual language pre-training, existing large language models (LLMs) may be augmented to incorporate visual inputs. For example, VisualGPT and FLAMINGO may directly fuse visual information into the layers of a language model decoder using a cross-attention mechanism instead of using images as additional prefixes to the language model. Other approaches, such as instructional tuning, or linearly projecting the visual embeddings into the input space of LLMs, may also have been explored. Vamos may follow this linear projection approach to incorporate visual embedding inputs, with the goal to understand if and how they are complementary to text-based video representations.

Additionally, tool-using LLMs may have been recently proposed to invoke and incorporate the use of task-specific modules, where visual perceptions may consist of a substantial subset of the tools. Notably, Visual-Program and ViperGPT may have proposed to apply LLMs to generate symbolic programs based on pre-selected computer vision modules for visual question answering. Closest to Vamos is Socratic Models, where the authors may have proposed to use natural language as the common interface to connect foundation models with different input and output modalities. Vamos differs from these approaches as it may aim to understand the power and limitations of text-based representation for a wide range of video understanding tasks, through quantitative experiments and qualitative analysis.

Text-Based Video Representation

Compared with a single image, the video data may often contain more complex and dynamic information including context and interactions. Prior works may have demonstrated the effectiveness of condensing images into conceptual or natural language bottleneck with good interpretability, while it's still unclear if long form videos with richer dynamics may also be condensed into such explainable textual representations. To translate videos into language bottleneck, one may consider two methods: discrete action labels and free-form text descriptions.

The system and method may use an extremely compact representation by condensing videos into sequences of discrete action labels, which may offer a more compact representation. In practice, this may be achieved through the application of action recognition models such as Transformer encoders that operate in the pre-defined action space.

Video text descriptions may use free-form natural language to characterize objects, scenes, and actions, which may succinctly summarize the essential elements depicted in the video. It may transform complex and dynamic visual information into more comprehensible and interpretable textual descriptions. The system and method may employ off-the-shelf image captioning models such as BLIP-2 that may process sampled frames to produce frame-level captions, which maybe subsequently concatenated to form a comprehensive video-level caption.

Versatile Action Models

Figures 2A, 2B:
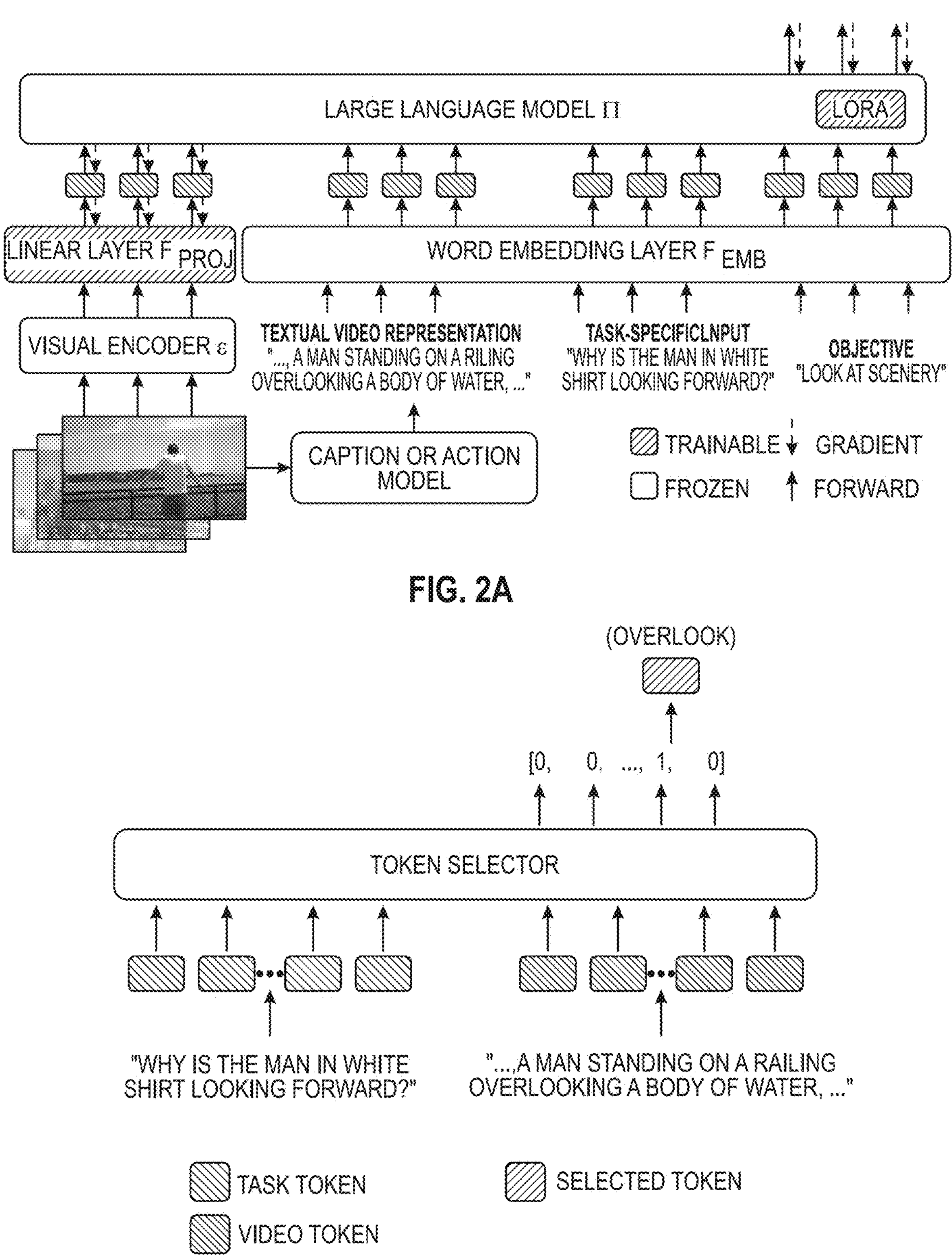
FIG. 2A is an exemplary block diagram displaying the operation of a Versatile Action Models (Vamos) for video understanding, in accordance with an embodiment of the disclosure.
FIG. 2B is an exemplary block diagram of a token selector which may be used with the Vamos of FIG. 2B, in accordance with an embodiment of the disclosure.

Benefiting from the encoded extensive prior knowledge, LLMs may have demonstrated strong capability for temporal and causal reasoning, which may be crucial for video understanding. Vamos may be a framework to utilize LLMs to unify video dynamic modeling tasks, including comprehending historical content (video question answering, VQA) and future prediction (long-term action anticipation, LTA). As may be shown in FIG. 2A, given a video V and a pretrained LLM π, the input sequence $x_t=[x_{tvr}, x_{task}]$ may consist of the textual video representations $x_{tvr}$ of V and other task specific language inputs $x_{task}$ (e.g., instructions, questions, targets). The frozen word embedding layer $F_{emb}$ may first generate the corresponding text tokens $z_t=F_{emb}(x_t) \in R^{L_t \times D}$, where $L_t$ may be the sequence length of $x_t$, D may be the feature dimension.

To address any residual information not entirely captured by the text-based representations, one may incorporate a learnable linear projection layer $F_{proj}$ to align visual features with the language space. Specifically, the frozen vision backbone E may take in $N_v$ frames $[v_1, \ldots v_{Nv}]$ sampled from V to generate the visual features. These visual features may then input into the projection layer $F_{proj}$ to produce vision tokens $z_v=F_{proj}(E(v_1, \ldots v_{Nv}) \in R^{N_V \times D}$. $z_v$ and $z_t$ may then be concatenated and fed into the LLM π. During training, the LLM π may be optimized with the standard language modeling loss using LoRA.

Vamos may accommodate multiple video understanding tasks that may be formatted as sequence modeling tasks with varying task-specific inputs $x_{task}$ and modeling objectives. Specifically, for the VQA task, $x_{task}$ may be composed of instructions, questions, and answers, with the answer being the training objective. During inference, the answer that may maximize sequence modeling likelihoods may be selected for multiple-choice QA, or directly generated for open-ended QA, depending on the dataset. For the LTA task, $x_{task}$ may be composed of instructions and future actions, where the training objective may be the future action sequence. During inference, the trained LLM may generate future action sequences based on history actions.

Lightweight Token Selector

One may also investigate the potential of compressing long input sequences and extracting keys element from the generated textual representations to probe the crucial information for downstream video understanding tasks. One may design a lightweight token selector as an add-on module (shown in FIG. 2B) for Vamos. The token selector may take in a sequence of textual video tokens to be selected, and a task specific token sequence, functioning as queries. It may pick a single token from the video tokens that may be most relevant for downstream video understanding. To select a condensed token sequence for a video, the original textual video token sequence with L tokens may be first uniformly divided into k<<L segments $\{X^{(1)}, \ldots, X^{(k)}\}$ containing n tokens. Each segment $X^{(i)}=\{x_1^{(i)}, \ldots, x_n^{(i)}\}$ may be fed into the token selector as candidate tokens, from which one token $x^{(i)}$ may be selected based on the task texts (question for VQA).

Within the token selector, $\{x_1^{(i)}, \ldots, x_n^{(i)}\}$ may first be projected to a lower dimension, then inputted into a shallow transformer encoder to obtain encodings $\{s_1^{(i)}, \ldots, s_n^{(i)}\}$. A linear layer then may take these encodings and generate the log its $g^{(i)} \in R^n$ for final selection. During training, to maintain model differentiability, one may apply Gumbel-Softmax to the log its $g^{(i)}$ to pick the final selected token x(i) for each segment $x^{(i)}$. In this way, k tokens $\{x^{(1)}, \ldots, x^{(k)}\}$ may be sampled as a condensed representation of the original text sequence with much smaller length and input to downstream LLMs for video understanding.

EXPERIMENTS

Below, one may see that experiments were conducted on two tasks and four datasets with both quantitative and qualitative analysis.

Task and Datasets

One may focus on two major video understanding tasks: long-term action anticipation and video question answering.

Long-term action anticipation. The long-term action anticipation (LTA) task may ask a model to predict a sequence of actions in form of verb-noun pairs in a long future window based on video observations of the past actions. In LTA, a long video V may first be split into a number of annotated video segments. Given video observation before segment i, one's task may be to predict the future actions in sequences of verb-noun pairs of the next Z segments allowing K candidate sequences. The correctness of the predicted sequence may be measured with edit distance. We evaluation on:

The above may be evaluated as follows. Ego4D may be comprised of 3,670 hours of egocentric videos in hundreds of scenarios of daily life activity. The Ego4D LTA v2 benchmark may include a total duration of around 243 hours of videos annotated into 3472 clips with 117 verbs and 521 nouns. One may follow the official dataset splits and adopt the official parameters of the evaluation metric, with Z=20 and K=5.

Video Question Answering

Given a set of videos V, and a corresponding set of language-based questions $Q_v$ and their candidate answers $A_q$. The goal of video question answering (VQA) task may be to predict the correct answer A for each video-question pair. The performance may be measured by accuracy. For VQA, we evaluate on three datasets:

EgoSchema may be a recently proposed diagnostic datasets derived from Ego4D for long-form video understanding. In contrast to previous video question answering benchmarks where the input videos are generally less than one-minute long, Egoschema contains videos that may span 3-minute long with high temporal certificate to testify the video understanding model's capability to understand long videos. It may contain 5031 videos and each video may have a multiple-choice question. It may require zero-shot evaluation and releases answers to 500 questions for development.

NeXT-QA may be a popular multiple-choice video question answering benchmark that may test video understanding in terms of describing and reasoning the temporal actions. It may contain 5,440 video clips and 47,692 questions, grouped into causal (48%), temporal (29%) and descriptive (23%).

IntentQA may be another multiple choice VQA dataset built on top of NeXT-QA but focuses on intent reasoning. One may select the videos related to causal and temporal questions from NeXT-QA and constructed their own questions and answers to focus on testifying models' performance on reasoning questions.

Implementation

Generating Action Labels

To generate action labels for videos, one may use a recognition model pretrained on Ego4D LTA. It may be a 3-block 6-head transformer-encoder that takes 4 CLIP features and outputs two log its for verb and noun, respectively. It may predict actions in the action space predefined by Ego4D LTA. For each video, the action recognition model may sample 4 frames for each 8s segment split uniformly and output a verb and noun pair for the segment.

Generating Video Captions

One may zero-shot generate task-agnostic video captions using BLIP-2 for Ego4D LTA, IntentQA, and EgoSchema, LLaVA-1.5 for NEXT-QA. For Ego4D LTA, one may sample the center frame for each video segment to generate its caption. The captions for the 8 observed segments may then concatenated as the video representations. For VQA benchmarks, one may first uniformly sample a fixed number of frames for each video, then caption each frame and concatenate these frame-level captions to represent the video. For NEXT-QA, IntentQA, and EgoSchema one may sample 6, 6, and 12 frames, respectively.

Vamos for Temporal Modeling

For full-shot VQA and LTA, one may use Llama2-7B, an open-sourced LLM as the temporal model for video understanding. During training, one may use low-rank adaption (LoRA) adapter to perform parameter-efficient fine-tuning on the training set. For vision input, one may use the frozen CLIP ViT-L/14 to extract image features. For the zero-shot long-form VQA on EgoSchema, one may use several popular LLMs including OpenAI GPT-3.5-turbo, GPT-4 and Llama2-chat-13B.

LTA: Action Modeling with Vamos

One may first apply Vamos on the long-term action anticipation task, which may require direct modeling of video temporal dynamics by predicting future actions tokens based on video observation. One may finetune Vamos on Ego4D LTA dataset with three types of representations: the recognized action labels, free-formed captions, and the continuous vision features. As detailed in the first three rows in Table 1 below, one may observe that the action-based representation may typically outperform the vision-based input. Notably, the action representation, despite its compact nature, may surpass captions, which may provide more extensive details and descriptions of the observed events. This suggests that a discrete and structured sequence of actions may serve as an effective representation for modeling video temporal dynamics.

TABLE 1

Vamos with various video representations on LTA task. Results are reported on Ego4D LTA test set, the metric is edit distance.

| Input | Ego4D-LTA ↓ | | |
|---|---|---|---|
| | Verb | Noun | Action |
| vision | 0.653 | 0.673 | 0.884 |
| action | 0.661 | 0.651 | 0.878 |
| caption | 0.676 | 0.675 | 0.890 |
| vis + act | 0.643 | 0.650 | 0.868 |

TABLE 1

Vamos with various video representations on LTA task. Results are reported on Ego4D LTA test set, the metric is edit distance.

| Input | Ego4D-LTA ↓ | | |
|---|---|---|---|
| | Verb | Noun | Action |
| vision | 0.653 | 0.673 | 0.884 |
| action | 0.661 | 0.651 | 0.878 |
| caption | 0.676 | 0.675 | 0.890 |
| vis + act | 0.643 | 0.650 | 0.868 |

LLM as Long-Term Video Temporal Reasoner

Experiments on LTA task reveal that compact action labels may be effective for video temporal modeling, but is action representation alone sufficient for comprehensive video understanding? One may delve into a more challenging task: long-form video question answering, which may demand an extensive understanding and reasoning of the video content. One may conduct zero-shot experiment on EgoSchema, a recent challenging video question answering benchmark where existing state-of-the-art visual-language models struggle.

One may employ OpenAI GPT-4 as the zero-shot video reasoner, and the same models used for LTA to zero-shot extract action labels and captions (BLIP-2) as well. Results may be listed below in Table 3. One may observe the LLM utilizing both zero-shot generated actions and captions may outperform current best-performed visual-language model (InternVideo). Contrasting with the action prediction task, captions with abundant details and semantic information may serve as a much stronger representation for the challenging VQA task. Furthermore, one may use the video narrations of 50 examples provided by the authors as "oracle" captions and evaluate on this subset. Remarkably, the LLM may achieve an impressive accuracy of 81.8% with the "oracle" captions. Although not directly comparable with the full-set performance, it may reflect the vast potential and generalizability of caption-based textual video representations and the LLMs' capability for reasoning over broad time spans.

TABLE 3 zero-shot VQA on Egoschema

| Model | Input Type | Full Set Acc. |
|---|---|---|
| InternVideo [72] | frame | 32.1% |
| GPT-4 | action | 38.12% |
| GPT-4 | caption | 48.26% |
| GPT-4* | gi-narration | 81.80% |

*denotes subset results.

What Makes Good Video Representation?

In addition to text features, Vamos may also integrate vision language features. One may investigate whether different modalities encode complementary information on Ego4D, IntentQA, and Next-QA. One may train the Vamos model to incorporate the visual embeddings (the linear layer in FIG. 2), and use LoRA to update the weights of Llama-2. From Ego4D LTA, results shown in Table 1 above, one may observe incorporating vision input with the compact action sequence further enhances model performance especially on verb and action prediction. For the VQA benchmarks NeXT-QA and IntentQA, as illustrated in Table 2 above, the caption-based textual video representations may outperform purely visual representations in both content description and causal reasoning. This may align with one's prior observations from EgoSchema that captions may serve as a strong representation for question answering and reasoning. Contrasting with the LTA task, adding visual features to captions may only marginally influence the performance on the two VQA datasets. This may suggest that the task-agnostic captions may already contain sufficient information and cues to address the questions in these benchmarks.

How Many Tokens are Needed for Reasoning?

While it may be shown that zero-shot captions generated by open-box models may be effective representations of video and offer a competitive interface to interact with LLMs, one may further ask the following questions: How many tokens are really necessary to represent videos? What specific information from lengthy captions is actually being utilized by LLMs? One may then implant a lightweight token selector to Vamos to automatically compress the captions into more compact token sequences.

One may conduct experiments on the NEXT-QA benchmark. In detail, after the word embedding layer in Vamos, the long caption-based textual video token sequence may be uniformly partitioned into 40 segments. The token selector may then be applied on each segment to select one token. In this way, one may condense a long sequence (644 on average) into 40 tokens. These 40 tokens may then be fed into LLMs as the new compressed representation of original video for down-stream video question answering task. During training, the token selector may be optimized together with the Vamos.

For NEXT-QA dataset, one may follow previous settings to use captions from 6 frames generated by LLaVA. For comparison, one may also show the vision-only performance taking in 12 frames and the performance with unselected caption-based input. The results may be shown in Table 4 below. After condensing the prompts from an average of 644 tokens to 40 tokens, Vamos may experience an expected performance drop but still achieves a competitive 65.3% accuracy, outperforming the vision-only baseline utilizing double input frames by 4.1%. When further compressed to 20 tokens, the performance may drop to 59.5%, slightly worse than the vision baseline. This may show the sparsity of the free-form natural language captions for video reasoning and indicates a promising potential to compress the textual representation for better practical application. Besides, instead of using hard selection (choosing one token with highest score) during inference, one may also perform soft-selection (using weighted pooling by applying Softmax instead of hard-max to the log its). Interestingly, the soft-selection may achieve similar performance with hard-selection even with access to the whole sequence, indicating there may be few missing information left in the unselected tokens.

TABLE 4

Condensing captions with token selector on NeXT-QA.

| Input | selected # | Cau. | Tem. | Des. | All |
|---|---|---|---|---|---|
| Frame | all | 61.5 | 58.2 | 66.3 | 61.2 |
| Caption | all | 70.9 | 69.3 | 77.7 | 71.5 |
| Caption | 20/644 | 59.5 | 56.8 | 64.6 | 59.5 |
| Caption | 40/644 | 65.4 | 62.4 | 70.5 | 65.3 |
| Caption* | 40/644 | 65.6 | 62.4 | 70.4 | 65.4 |

Average caption length is 644.
*denotes soft-selection results.

Qualitative Analysis and Intervention

Compared with continuous visual features, one advantage of the textual video representation is that it may have excellent interpretability that makes understanding the relationship between input and prediction direct and simple. One may then make qualitative analysis of some positive and negative results from Vamos and the token selector.

Visualization of Results

Figure 3:
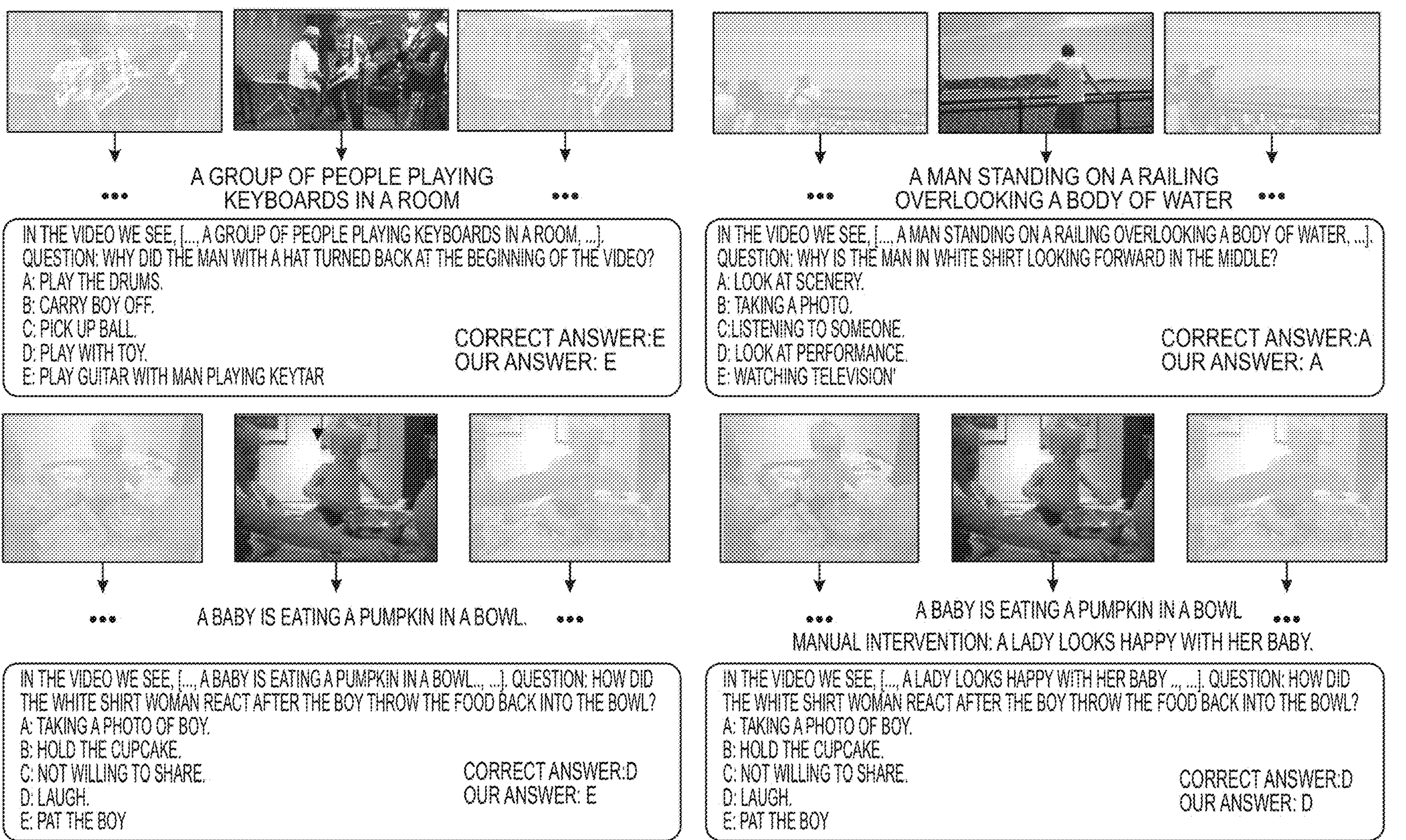
FIG. 3 shows exemplary block diagram illustrating Vamos predictions and manual intervention, in accordance with an embodiment of the disclosure.

In FIG. 3, one may demonstrate two correctly answered examples and one incorrect of Vamos from IntentQA. From the two positive examples one may see that the generated captions well describe the scene and activities happening in the video ("overlooking water" and "playing keyboards"), thus providing strong clues for LLMs to answer the question about description ("look at scenery") and reasoning ("play guitar with man playing keytar"). However, a suboptimal caption may cause the Vamos failure of reasoning. In the third negative example, the captions may successfully describe the baby's action of eating but fail to acknowledge the presence and potential actions of a woman in the corner of the scene. This omission may lead to an incorrect prediction regarding the woman's reaction.

Visualization of Token Selector

Condensing the captions may consist of reducing thousands of tokens into 40 with a token selector. It may not only significantly accelerate the training and inference speed but may also provide a better view for one to understand what are the key elements for Vamos to understand and reason about the video. In FIG. 4, one may demonstrate two positive examples and one negative example of Vamos with a token selector from NeXT-QA. After the token selector, captions in natural language may be broken into separated words that may be highly descriptive and related to the question. The two positive examples may demonstrate Vamos' strong ability to reason by the selected tokens providing direct or indirect clues to the question. In the challenging negative example, even highly related tokens such as "race" and "track" may be selected, Vamos may still tend to relate "tyres" with the more common word "car", indicating the potential bias encoded by the LLMs from pre-training.

Test Time Intervention

In addition to good interpretability, the text-based white-box representation may also provide the capability of post-hoc test-time intervention, which may be important for diagnosing and fixing failed predictions without retraining the reasoning model. In FIG. 3 and FIG. 4, one may show examples of test-time intervention of the negative examples for both original Vamos and Vamos with selector. By providing more accurate and related captions or tokens, Vamos may correctly answer the question it used to fail as shown above.

Design Choices and Ablation Study

Caption Models

One may study the impact of caption models on the reasoning performance on NeXT-QA. One may compare two captioning models: BLIP-2 and LLaVA-1.5-7b. One may observe that captions generated by BLIP-2 may be generally concise spanning less than 20 tokens long while their counterparts from LLaVA-1.5 may be more detailed and descriptive with about 100 tokens on average. Results shown in Table 5 below may show that captions from LLaVA-1.5 may achieve better performance. Interestingly, the two captions may achieve similar performance on descriptive questions but LLaVA-1.5 captions may perform significantly better on casual and temporal reasoning. This may indicate that reasoning from videos may generally benefit more from extra details compared with describing and summarizing.

TABLE 5

Ablation on captioning model and frame numbers.

| Caption | Frame # | Cau. | Tem. | Des. | All |
|---|---|---|---|---|---|
| LLaVA-15 | 1 | 66.4 | 63.0 | 72.0 | 66.3 |
| LLaVA-1.5 | 3 | 68.5 | 65.2 | 76.4 | 68.8 |
| LLaVA-1.5 | 6 | 70.9 | 69.3 | 77.7 | 71.5 |
| BLIP-2 | 6 | 67.9 | 64.6 | 77.1 | 68.4 |

Number of Captions

One may study the impact of sampled frame numbers for captioning on NeXT-QA. As shown in Table 5 above, one may find that with more captions of frames spanning across the video, the model may perform better. This result may align with one's expectation as one may bring information with more granularity from the videos.

Comparison of LLMs on Zero-Shot VQA

Besides, one may also compare various LLMs' zero-shot performance based on the same caption representations on EgoSchema. As shown in Table 6 below, GPT-4 may achieve large improvements comparing with GPT-3.5-turbo and Llama2-Chat-7B, demonstrating the potentiality and advantage of textual representation to naturally incorporate the improvements of LLMs.

TABLE 6

Egoschema VQA zero-shot Performance.

| Model | Input Type | Frames |
|---|---|---|
| VIOLET [18] | frame | 19.9% |
| FrozenBiLM [79] | frame | 26.9% |
| mPLUG-Owl [81] | frame | 31.1% |
| InternVideo [72] | frame | 32.1% |
| Llama2-13B | caption | 36.73% |
| GPT-3.5 | caption | 41.24% |
| GPT-4 | caption | 48.26% |

Comparison with State-of-the-Art

In the end, one may compare the above versatile action models with other state-of-the-art models on the four benchmarks in Tables 6, 7, 8, and 9. In Ego4d LTA, Vamos only using CLIP-based features may outperform the previous SOTA model AntGPT-EgoVLP with extra fine-tuning on egocentric-videos in both verb and action. On EgoSchema, Vamos zero-shot performance with GPT-4 may outperform the existing best performing model by a significant margin, with over 50.3% increase in accuracy. On NeXT-QA, Vamos performance may be better than all models with similar size and slightly worse than SeViLA, which trains on additional VL dataset. On IntentQA, Vamos significantly outperforms all existing baselines, with a 17.4% accuracy improvement.

TABLE 7

Comparison on NeXT-QA benchmark.

| Model | Cau. | Tem. | Des. | All |
|---|---|---|---|---|
| HGA [34] | 46.8% | 52.1% | 59.3% | 50.4% |
| HCRN [40] | 45.9% | 49.3% | 53.7% | 48.2% |
| VGT [77] | 53.4% | 56.4% | 60.5% | 56.9% |
| AIO [70] | 48.0% | 48.6% | 63.2% | 50.6% |
| ATP [5] | 53.1% | 50.2% | 66.8% | 54.3% |
| MIST [20] | 54.6% | 56.6% | 66.9% | 57.2% |
| HiTeA [30] | 62.4% | 58.3% | 75.6% | 63.1% |
| ATM [10] | 55.3% | 55.6% | 65.3% | 57.0% |
| Intern Video [72] | 62.5% | 58.5% | 75.8% | 63.2% |
| BLIP-2 [43] | 70.1% | 65.2% | 80.1% | 70.1% |
| LLaMA-VQA-7B [38] | 72.7% | 69.2% | 75.8% | 72.0% |
| Vamos (ours) | 72.6% | 69.6% | 78.0% | 72.5% |
| SeVILA[83]* | 74.2% | 69.4% | 81.3% | 73.8% |

*denotes model using additional dataset during training.

TABLE 8

Comparison with SOTA on IntentQA

| Model | CW | CH | TP&TN | ALL |
|---|---|---|---|---|
| HGA [34] | 44.88% | 50.97% | 39.62% | 44.61% |
| HQGA [76] | 48.24% | 54.32% | 41.71% | 47.66% |
| VGT [77] | 51.44% | 55.99% | 47.62% | 51.27% |
| BlinGPT [57] | 52.16% | 61.28% | 43.43% | 51.55% |
| CaVIR [44] | 58.4% | 65.46% | 50.48% | 57.64% |
| Vamos (ours) | 69.52% | 70.19% | 64.95% | 68.51% |

TABLE 9

Comparison with SOTA on Ego4D v2 test set

| Model | verb | noun | action |
|---|---|---|---|
| Slowfast [16] | 0.717 | 0.736 | 0.925 |
| VideoLLM [8] | 0.721 | 0.725 | 0.921 |
| PaMsEgoAI [29] | 0.684 | 0.679 | 0.893 |
| Palm [28] | 0.696 | 0.651 | 0.886 |
| AntGPT-CLIP [88] | 0.661 | 0.651 | 0.878 |
| AntGPT-EgoVLP [88] | 0.650 | 0.650 | 0.877 |
| Vamos (ours) | 0.643 | 0.650 | 0.868 |

One may study the form of representation for long videos and proposed versatile action models (Vamos) for video understanding. Through extensive experiments on long-term action anticipation and video question answer benchmarks, one may have demonstrated that surprisingly, direct application of free-form text descriptions generated by vision-language models may serve as strong video representation for all benchmarks considered, and the use of large language models may enable one to perform zero-shot reasoning and correct the answers via causal intervention. Vamos may achieve state-of-the-art results on Ego4D LTA, IntentQA, close to SOTA performance on NeXT-QA, and outperforms the best vision language model by 50% on EgoSchema. Although the results show the promise of free-form text representation, one may believe visual information may still be essential for complex video understanding and reasoning, and that further explorations on modeling and benchmarking may be needed.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure not to be limited to the particular embodiment disclosed, but that the present disclosure will include all embodiments that fall within the scope of the appended claims.

The invention claimed is:

1. A method for forming versatile action models for video understanding, comprising:

gathering data from a video, wherein the date comprises textual video representations and other task specific language inputs; and using a pre-trained large language model (LLM) next token prediction for action anticipation based on the data from the video; and generating a corresponding text token by inputting the textual video representations and other task specific language inputs into a frozen word embedding layer wherein the frozen word embedding layer samples a predetermined number of frames from the video and generates visual features, wherein the visual features are inputted into a projection layer to produce vision tokens.

2. The method of claim 1, wherein using a pre-trained LLM next token prediction for action anticipation based on the data from the video comprises unifying video dynamic modeling tasks, wherein the video dynamic modeling tasks comprises comprehending historical content and future prediction.

3. The method of claim 1, wherein gathering data from a video comprises converting visual inputs from the video into discrete action labels and free-form descriptions.

4. The method of claim 3, wherein converting visual inputs into discrete action label comprises condensing the video into sequences of discrete action labels through application of action recognition models that operate in a predefined action space.

5. The method of claim 3, wherein converting visual inputs from the video into free-form descriptions comprises:

processing sampling frames to produce frame level captions; and concatenating the frame level captions to form a comprehensive video-level captions.

6. The method of claim 5, comprising incorporating a learnable linear projection layer to align visual features with a language space.

7. The method of claim 1, comprising:

sampling a predetermined number of frames from the video by the frozen word embedding layer; and generating visual features by the frozen word embedding layer.

8. The method of claim 7, comprising:

inputting the visual features into a projection layer to produce vision tokens;

concatenating the vision tokens; and feeding the concatenated vision tokens into the pre-trained LLM.

9. The method of claim 1, comprising compressing input sequences above a desired length and extracting elements from the generated textual video representations to determine downstream video understanding tasks.

10. The method of claim 1, comprising:

providing a token selector, wherein the token selector takes in a sequence of textual video tokens; and selecting a single token from the sequence of textual video tokens for downstream video understanding.

11. The method of claim 10, comprising:

selecting a condensed token sequence;

dividing the condensed token sequence into a plurality of uniform segments, each uniform segment containing a unique textual video token forming the sequence of textual video tokens; and feeding the sequence of textual video tokens into the token selector.

12. The method of claim 11, comprising providing manual intervention to generate intervened tokens to fix incorrect downstream video understanding.

13. A method for forming versatile action models for video understanding, the method implemented using a computer system including a processor communicatively coupled to a memory device, the method comprising:

gathering data from a video by converting visual inputs from the video into discrete action labels and free-form descriptions by condensing the video into sequences of discrete action labels through application of action recognition models that operate in a predefined action space, and processing sampling frames to produce frame level captions, which are concatenated to form a comprehensive video-level caption; and using a pre-trained large language model (LLM) next token prediction for action anticipation based on the data from the video by unifying video dynamic modeling tasks, wherein the video dynamic modeling tasks comprises comprehending historical content and future prediction; and generating a corresponding text token by inputting the discrete action labels and free-form descriptions into a frozen word embedding layer wherein the frozen word embedding layer samples a predetermined number of frames from the video and generates visual features, wherein the visual features are inputted into a projection layer to produce vision tokens;

concatenating the vision tokens; and feeding the concatenated vision tokens into the pre-trained LLM.

14. The method of claim 13, comprising incorporating a learnable linear projection layer to align visual features with a language space.

15. The method of claim 13, comprising:

selecting a condensed token sequence;

dividing the condensed token sequence into a plurality of uniform segments, each uniform segment containing a unique textual video token forming the sequence of textual video tokens; and feeding the sequence of textual video tokens into a token selector; and selecting a single video token from the sequence of textual video tokens for downstream video understanding.

16. A method for forming versatile action models for video understanding, the method comprising:

gathering data from a video, wherein gathering data from a video comprises converting visual inputs from the video into discrete action labels and free-form descriptions by condensing the video into sequences of discrete action labels through application of action recognition models that operate in a predefined action space, and processing sampling frames to produce frame level captions, which are concatenated to form a comprehensive video-level caption;

generating a corresponding text token by inputting the discrete action labels and free-form descriptions into a frozen word embedding layer, wherein the frozen word embedding layer samples a predetermined number of frames from the video and generates visual features, wherein the visual features are inputted into a projection layer to produce vision tokens;

concatenating the vision tokens; and feeding the concatenated vision tokens into a pre-trained LLM next token prediction for action anticipation based on the data from the video by unifying video dynamic modeling tasks, wherein the video dynamic modeling tasks comprises comprehending historical content and future prediction.

17. The method of claim 16, comprising:

selecting a condensed token sequence;

dividing the condensed token sequence into a plurality of uniform segments, each uniform segment containing a unique textual video token forming the sequence of textual video tokens; and feeding the sequence of textual video tokens into a token selector; and selecting a single video token from the sequence of textual video tokens for downstream video understanding.

* * * * *